United States Patent
Gottlieb et al.

(10) Patent No.: US 6,330,323 B1
(45) Date of Patent: Dec. 11, 2001

(54) ENHANCED OVERFLOW CALL PROCESSING

(75) Inventors: Louis G. Gottlieb, Colorado Springs, CO (US); Cathleen Frazier, Plano, TX (US); Wesley Rogers, Reston; Roger P. Engdahl, Herndon, both of VA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/584,517

(22) Filed: Jan. 11, 1996

Related U.S. Application Data

(63) Continuation-in-part of application No. 08/370,428, filed on Jan. 9, 1995, now abandoned.

(51) Int. Cl.$^7$ .................................................. H04M 7/00
(52) U.S. Cl. ........................ 379/220.01; 379/221.03; 379/266.04
(58) Field of Search ................................. 379/201, 207, 379/210, 211, 220, 221, 229, 230, 231, 265, 201.01, 201.02, 211.01, 211.02–211.05, 212.01, 219, 220.01, 221.01–221.15, 265.01, 265.02, 266.01, 266.04

(56) References Cited

U.S. PATENT DOCUMENTS

| | | |
|---|---|---|
| 4,191,860 | 3/1980 | Weber . |
| 4,400,587 | 8/1983 | Taylor et al. . |
| 4,723,272 | 2/1988 | Maat . |
| 4,756,019 | 7/1988 | Szybicki . |
| 4,757,267 | 7/1988 | Riskin . |
| 4,800,583 | 1/1989 | Theis . |
| 4,866,763 | 9/1989 | Cooper et al. . |
| 4,893,336 | 1/1990 | Wuthnow . |
| 4,896,350 | 1/1990 | Bicknell et al. . |
| 4,991,204 | 2/1991 | Yamamoto et al. . |
| 5,023,868 | 6/1991 | Davidson et al. . |
| 5,068,892 | 11/1991 | Livanos . |
| 5,086,460 | 2/1992 | Ash et al. . |
| 5,095,505 | 3/1992 | Finucane et al. . |
| 5,101,451 | 3/1992 | Ash et al. . |
| 5,119,366 | 6/1992 | Ardon et al. . |
| 5,253,288 | 10/1993 | Frey et al. . |
| 5,311,585 | 5/1994 | Armstrong et al. . |
| 5,369,695 | 11/1994 | Chakravarti et al. . |
| 5,394,464 | 2/1995 | Hanson et al. . |
| 5,402,478 * | 3/1995 | Hluchyj et al. ........................ 379/221 |

* cited by examiner

Primary Examiner—Fan Tsang
Assistant Examiner—Roland G. Foster

(57) ABSTRACT

A system and method for Enhanced Overflow Call Processing redirects calls which cannot be completed to alternate terminations. An originating switch queries a network database for an alternate termination for the call each time the originating switch detects that the call cannot be completed to the current termination. The network database determines the alternate termination for each query using a hierarchical set of multi-branch overflow statements which are configured by the user. A set of overflow statements is selected by the network database based on the original termination of the call. The set of overflow statements is searched hierarchically until an active overflow statement is found. This overflow statement then controls all queries relating to that call. The reason the call was not completed is used to select either an alternate termination to which the call is to be routed or a particular treatment, such as a busy signal or network message, which is to be applied to the call. If an alternate termination is selected, the originating switch routes the call to the alternate termination. The process then repeats until either the call is completed, the overflow statement specifies a treatment is to be applied, or a predetermined number of completion attempts to alternate terminations have occurred.

14 Claims, 11 Drawing Sheets

| ISDN Cause Values ||
|---|---|
| 1 | Unallocated |
| 17 | User Busy |
| 18 | No User Responding |
| 27 | Destination Out of Order |
| 34 | No Circuit Available |
| 38 | Network Out of Order |
| 41 | Temporary Failure |
| 42 | Switching Equipment Congestion |
| 44 | Requested Circuit Channel Not Available |
| 63 | Service or Option Not Available |
| 111 | Protocol Error, Unspecified |
| 127 | Interworking, Unspecified |

FIG. 6

ENHANCED OVERFLOW CALL PROCESSING

CROSS-REFERENCES TO RELATED APPLICATION

This is a continuation-in-part of patent application Ser. No. 08/370,428, filed Jan. 9, 1995 now abandoned.

BACKGROUND OF THE INVENTION

1. Field of the Invention

This invention relates to routing a telephone call to an alternate termination when the call cannot be completed to an originally selected termination.

2. Background Information

Many businesses desire that calls which cannot be completed to their intended terminations be rerouted to a secondary or alternate termination. Calls may fail to complete for a variety of reasons. For example, the intended termination may refuse the call or may be unable to accept it. A customer dialing an 800 number might initially be routed to an understaffed call center. Rather than have the customer receive a poor grade of service, such as an unacceptably long wait, the call center manager may prefer to redirect the call to a secondary termination which may be able to provide a higher grade of service.

A typical prior art telephone network 100, which provides call redirection, is shown in FIG. 1, as having three network switches 102, 104 and 106 are connected by trunks 122, 124 and 126. Each switch 102, 104 and 106 may also be connected to one or more local exchange networks (LEN) and/or one or more customer premise equipment (CPE), represented by blocks 110, 112 and 114, respectively. Each LEN/CPE is connected to one or more terminations, such as standard telephones or private branch exchanges (PBX), represented by blocks 111, 113 and 115, respectively. Each switch is also communicatively coupled to at least one network database 108 over signaling network 128.

Network 100 is exemplified by U.S. Pat. No. 5,369,695 to Chakravarti et al. In Chakravarti et al., a telephone network switch 102 is arranged so that after forwarding an incoming call from LEN/CPE 110 to an intended terminating switch 104, switch 102 responds to any one of a number of conditions requiring redirection of the call by redirecting the call to an alternate termination, switch 106, identified as a function of a redirect code derived from associated calling information. Such conditions include the case of ring no answer and the case in which an answering party requests such redirection. The switch obtains the redirection code from a centralized network database 108 which derives the redirection code from calling information supplied by the switch.

Chakravarti et al. describes call redirection in response to three conditions: ring no answer, busy and post ringing redirection request. However, call redirection may be desired in response to any condition which prevents call completion. Examples of such conditions are: network congestion, transmission line outage, switch failure and LEN or CPE inability to complete the call. Chakravarti et al. does not deal with these conditions. In addition, Chakravarti et al. describes performing the same call redirection in response to all three conditions. It is desirable to vary the redirection performed depending upon the condition encountered.

Another typical prior art redirection scheme is described in U.S. Pat. No. 5,253,288 to Frey et al. In Frey et al., a call from originator 111 is initially extended through a toll network 100 toward the first destination 113; if the toll network 100 is congested and cannot reach an egress switch 104 to access the first destination 113 or if a local exchange network 112 connecting the first destination 113 to the toll network 100 is congested, or if a first destination PBX 113 cannot be reached from the toll or local network because all access channels thereto are blocked, or if the first destination PBX 113 is congested or attendants are unavailable, an indication that the call cannot be completed to the first destination 113 is sent back to the ingress switch 102 of the toll network for that call. The call is then redirected from the ingress switch 102 of the toll network to an alternate destination 115. If the first choice destination 113 is a PBX and the PBX rejects a call, the reason for the rejection can be used for altering the choice of an alternate destination or for canceling a potential redirection.

Frey et al., describes redirection of calls using tables organized around "non-existent" switch numbers. When a call having an indication that it is to be directed to a non-existent switch enters a switch, the non-existent switch number is translated within the switch to provide the real number of the destination switch. Frey et al., describes providing multiple alternative destinations by using tables to store a plurality of destination entries and incrementing from one table entry to the next. Frey et al. also describes altering the choice of an alternate destination based on the reason a call was rejected, but does not describe a mechanism for accomplishing this. The method described in Frey et al. provides limited flexibility for call redirection.

A need exists for improved control over multiple redirection of calls to upgrade the quality of service currently available to businesses and subscribers.

SUMMARY OF THE INVENTION

The system and method for enhanced call redirection provides call redirection of a call from one termination to at least one alternate termination in response to the failure of a call to be completed. In addition, it provides a hierarchical, user-configurable capability to redirect calls differently depending upon the reason the call was not completed.

In operation, a call enters a telephone network through an originating switch. The originating switch queries a network database to obtain routing information needed to route the call. Using this routing information, the originating switch routes the call to a terminating switch which attempts to complete the call to a currently selected termination. The originating switch then determines whether the call was completed to the currently selected termination. If the call was not completed, the originating switch releases the call from the terminating switch and queries the network database for a second termination for the call. The originating switch then routes the call to a terminating switch coupled to the second termination.

The originating switch queries a network database for an alternate termination for the call each time the originating switch detects that the call cannot be completed to the current termination. The network database determines the alternate termination for each query based on information regarding the reason the call was not completed. This information is supplied by the originating switch in the query message. The determination is controlled by a hierarchical set of multi-branch overflow statements which are configured by the user.

A set of overflow statements is selected by the network database based on the original termination of the call. The set of overflow statements is searched hierarchically until an active overflow statement is found. This overflow statement then controls all queries relating to that call. The reason the call was not completed is used to select either an alternate termination to which the call is to be routed or a particular treatment, such as a busy signal or network message, which is to be applied to the call. If an alternate termination is selected, the originating switch routes the call to the alternate termination. The process then repeats until either the call is completed, the overflow statement specifies a treatment is to be applied, or a predetermined number of completion attempts to alternate terminations have occurred.

BRIEF DESCRIPTION OF THE DRAWINGS

FIG. 2b is an exemplary block diagram of a switch 212, 214 or 216, shown in FIG. 2a.

FIG. 2c is an exemplary block diagram of a network database 208, shown in FIG. 2a.

FIG. 3 is a state diagram of the operation of network 200 of FIG. 2a.

FIG. 5a is a flow diagram of a call redirection process 500, implemented in network 200 of FIG. 2a.

FIG. 6 is a chart of ISDN call values.

DETAILED DESCRIPTION OF THE INVENTION

Figure 1:
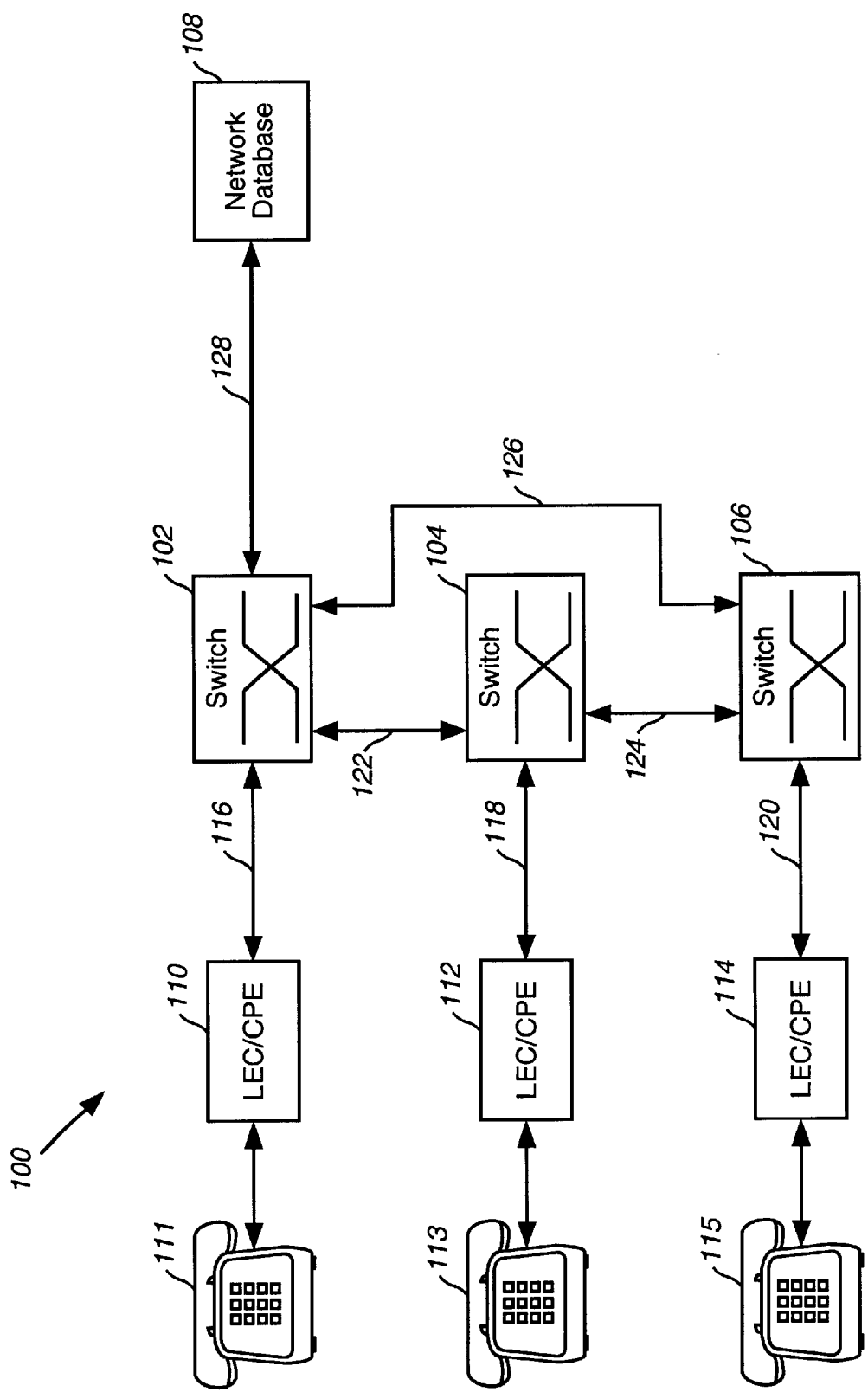
FIG. 1 is a typical prior art telephone network 100 which provides call redirection.
Figure 2A:
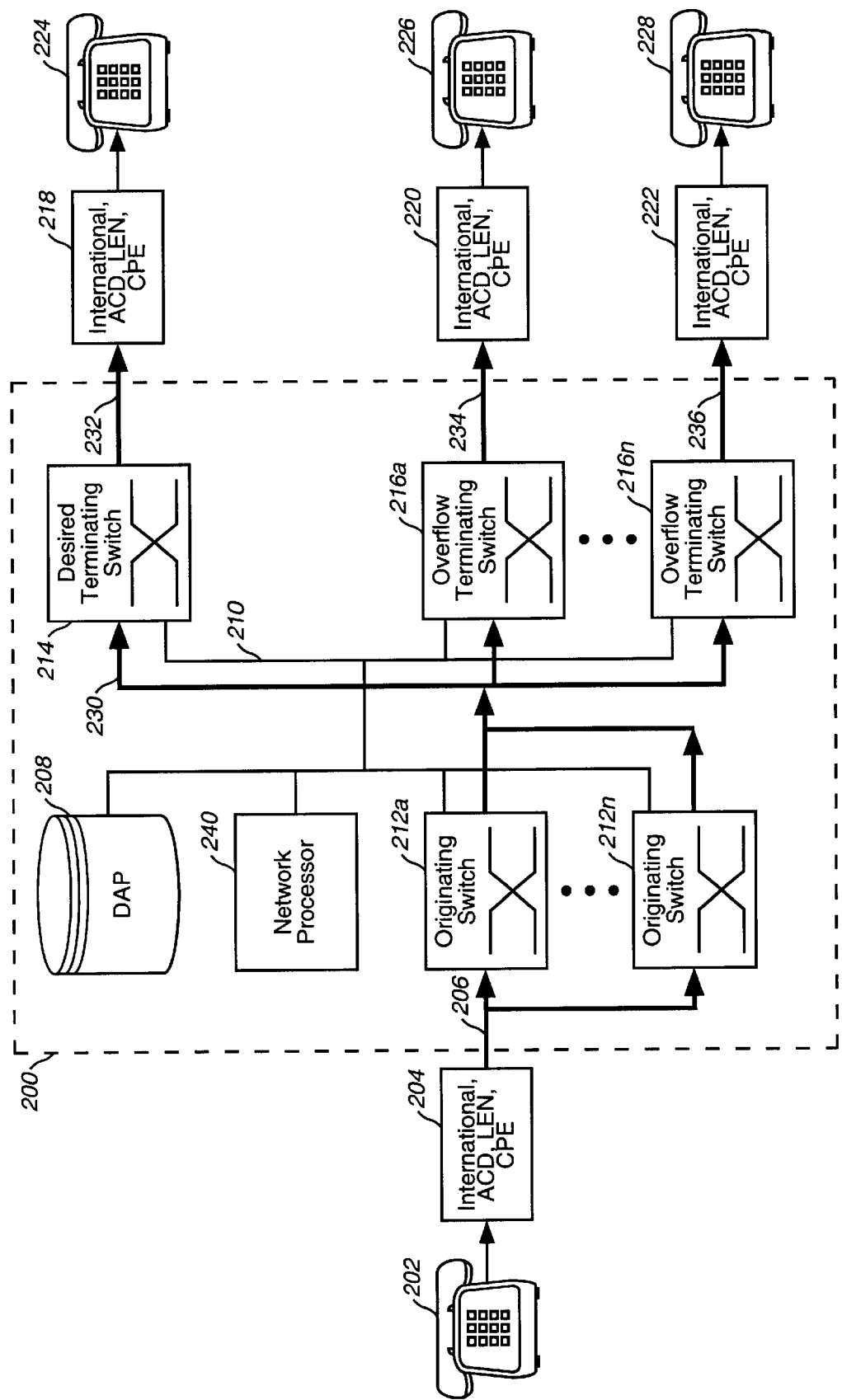
FIG. 2a is an exemplary block diagram of a telephone network 200, in accordance with the present invention.

FIG. 2a is an exemplary block diagram of a telephone network 200, in accordance with the present invention. Network 200 includes a plurality of telecommunications switches 212a–n, 214 and 216a–n. For purposes of this explanation, particular switches are designated originating or terminating switches based on the function they perform in this example. Switches 212a–n are designated originating switches because they represent the switches through which an exemplary call enters network 200. Switches 214 and 216a–n are designated terminating switches because they represent the switches through which the call exits network 200. However, all switches shown are essentially similar and typically perform both functions simultaneously in actual operation.

A call is placed from origination 202 to termination 224. As shown in FIG. 2a, each station 202, 224, 226 and 228 connects to network 200 through a telephone system 204, 218, 220 and 222 respectively. Each telephone system 204, 218, 220 and 222 may be, for example, an international telephone system, an automatic call distributor, a local exchange network, a customer premise equipment, or a subtend.

Desired terminating switch 214 is coupled to desired termination 224 through telephone system 218. Switch 214 is designated "desired" to indicate that it is the originally intended terminating switch for the call. Each overflow terminating switch is coupled to an overflow termination 226 or 228 through telephone systems 220 or 222, respectively. Switches 216a–n are designated "overflow" to indicate that they are subsequent terminating switches of the call. For any particular call, there is only one desired terminating switch, but in actual operation, each switch typically is the desired terminating switch for some calls and the overflow terminating switch for other calls. In addition, the same switch may serve as both the desired and the actual terminating switch for the same call with respect to different customer terminations connected to that switch.

Signaling network 210 communicatively couples each switch and a network database, known as a network database 208. Signaling network 210 is a standard signaling network, such as, for example, ANSI SS7, ITU CCS7 or X.25. Network processor 240 is also communicatively coupled over signaling trunks 230 to all switches in network 200.

Each originating switch 212a–n is coupled through trunks 230 to desired terminating switch 214 and overflow terminating switches 216a–n. Trunks 230 represent a portion of the entire network 200 and may contain a number of trunks and switches. Calls are routed from originating switches to terminating switches over trunks 230. Calls may be routed directly from the originating switch to the terminating switch or they may be routed through one or more intermediate switches. Each originating switch 212a–n contains information identifying the other switches to which it is directly connected. If desired terminating switch 214 is directly connected, the originating switch will route the call directly to desired terminating switch 214. If desired terminating switch 214 is not directly connected, or if the originating switch detects that the call cannot be routed to desired terminating switch 214, network processor 240 recommends a routing through an intermediate switch. Network processor 240 sends a message containing the routing recommendation to the originating switch over signaling network 210, whereupon the originating switch routes the call according to the recommendation.

Figure 2B:
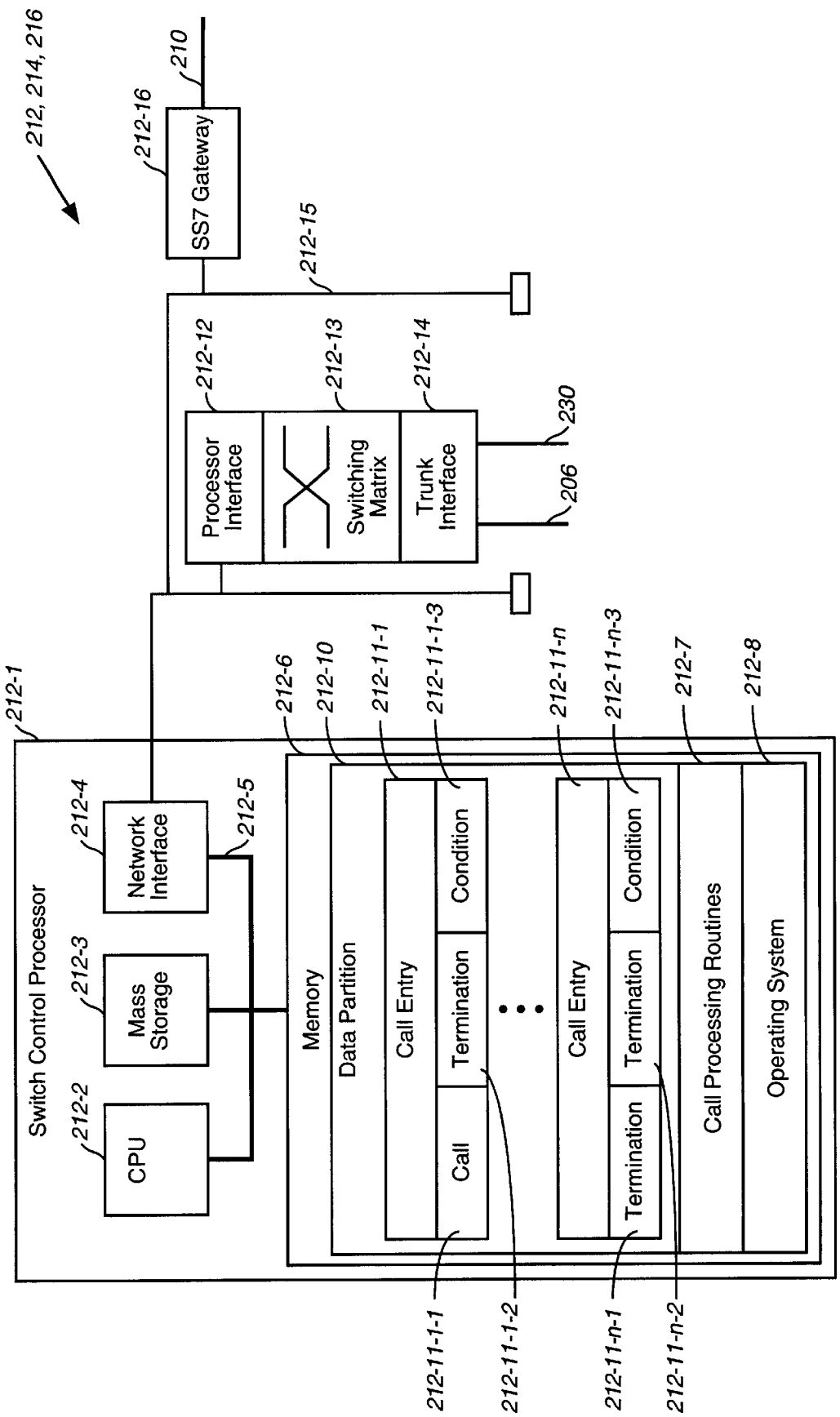

FIG. 2b is an exemplary block diagram of a switch 212, 214 or 216, shown in FIG. 2a. Switch 212 includes audio trunk interface 212-14 which connects switch 212 to trunks 206 and 230. Switching matrix 212-13 is connected to interface 212-14 and provides cross-connect switching between audio circuits. Processor interface 212-12 connects switching matrix 212-13 to local area network 212-15 and allows switch control processor 212-1, which also connects to network 212-15, to control and interrogate switching matrix 212-13. Also connected to network 212-15 is signaling interface 212-16 which connects switch 212 to signaling network 210.

Although only one switch control processor 212-1 is shown in FIG. 2b, it is well known in the art that switch functionality may be distributed among several intercommunicating processors. Such processors may communicate over LAN 212-15 or over other well known communication paths. Switch control processor 212-1 includes several elements. CPU 212-2 executes program instructions and processes data. Memory 212-6 stores program instructions executed by and data processed by CPU 212-2. Mass storage 212-3 stores data to be transferred to and from memory. Mass storage includes such devices as, for example, hard disk drives, floppy disk drives, removable disk drives, magneto-optic drives, optical drives and tape drives. Network interface 212-4 communicates with other devices and transfers data in and out of switch control processor 212-1 over local or wide area networks, such as, for example, Ethernet or Token Ring. All these elements are interconnected by bus 212-5, which allows data to be intercommunicated between the elements.

Memory 212-6 is accessible by CPU 212-2 over bus 212-5 and includes data partition 212-10, call processing routines 212-7 and operating system 212-8. Call processing routines 212-7 implement the portions of process 500 of FIG. 5a (to be described hereinafter) which are performed by the originating switch 212 and the terminating switches 214 and 216. Data partition 212-10 includes a plurality of call entries 212-11-1 to n, each entry corresponding to a call being routed by the switch. Each entry contains an indicator 212-11-1-1 to 212-11-n-1 of the call being processed. Each entry also contains an indicator 212-11-1-2 to 212-11-n-2 of the current termination to which the call is to be or has been routed and an indicator 212-11-1-3 to 212-11-n-3 of the condition or conditions encountered that caused the call completion attempt to fail. These indicators are used, as described hereinafter, to query network database 208 for alternate terminations.

Figure 2C:
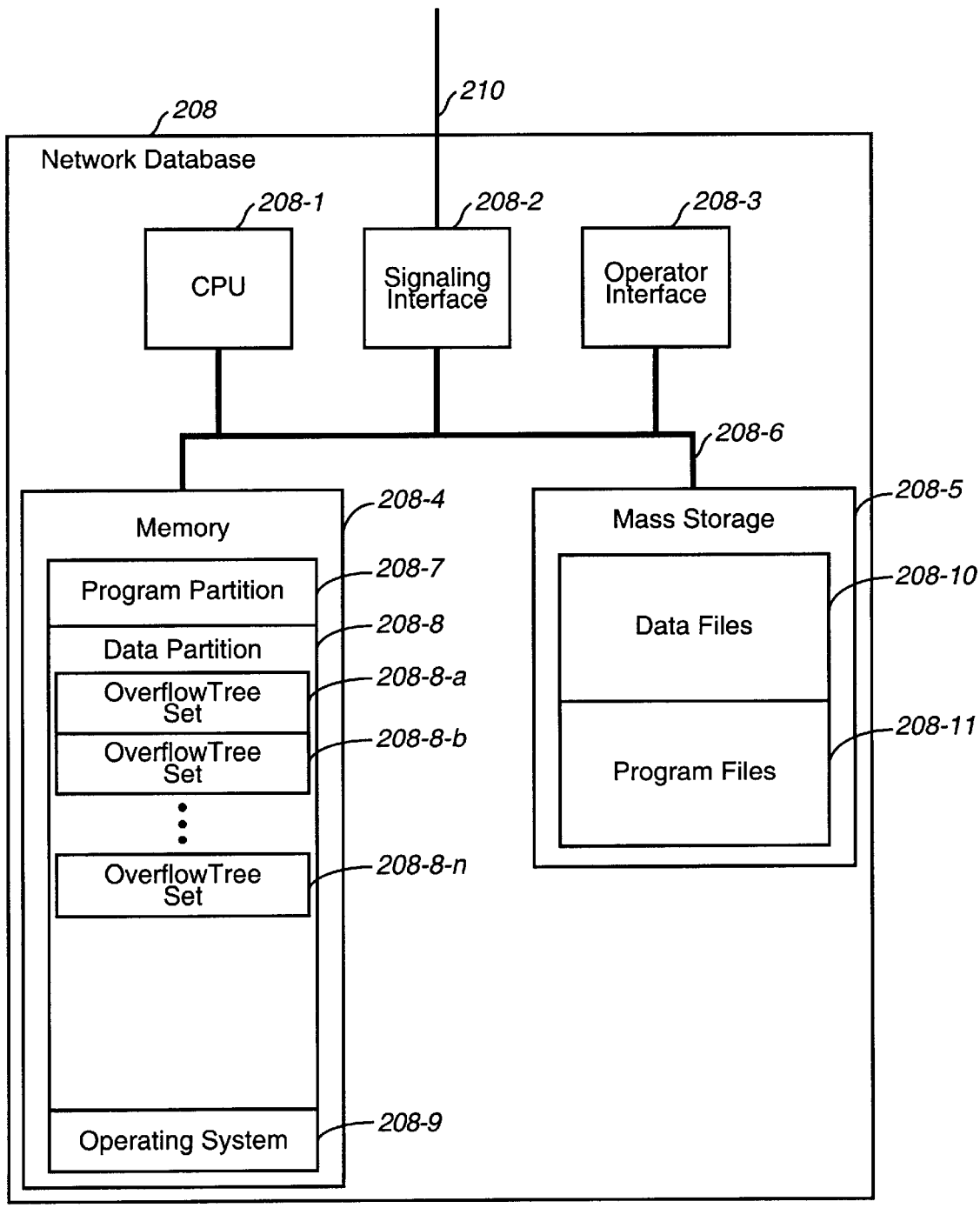

FIG. 2c is an exemplary block diagram of a network database 208. Although only one network database 208 is shown in FIG. 2a, it is well known in the art that a distributed architecture in which more than one system performs each function is entirely equivalent. Network database 208 includes several elements. CPU 208-1 executes program instructions and processes data. Memory 2084 stores program instructions executed by and data processed by CPU 208-1. Mass storage 208-5, stores data to be transferred to and from memory. Mass storage includes such devices as, for example, hard disk drives, floppy disk drives., removable disk drives, magneto-optic drives, optical drives and tape drives. Signaling interface 208-2 communicates with other devices and transfers data in and out of the computer system over signaling network 210. Network database 208 may also include an operator interface 208-3, which provides status information to and accepts commands from a system operator. All these elements area interconnected by bus 208-6, which allows data to be intercommunicated between the elements.

Memory 2084 is accessible by CPU 208-1 over bus 208-6 and includes operating system 208-9, program partition 208-7 and data partition 208-8. Program partition 208-7 stores and allows execution by CPU 208-1 of program instructions which implement the portions of process 500 of FIG. 5a infra. which are performed by the network database. Data partition 208-8 is accessible by CPU 208-1 and stores data used during the execution of program instructions, such as, for example, overflow trees sets 208-8-a through n. The structure of the overflow tree sets is described below.

Figure 3:
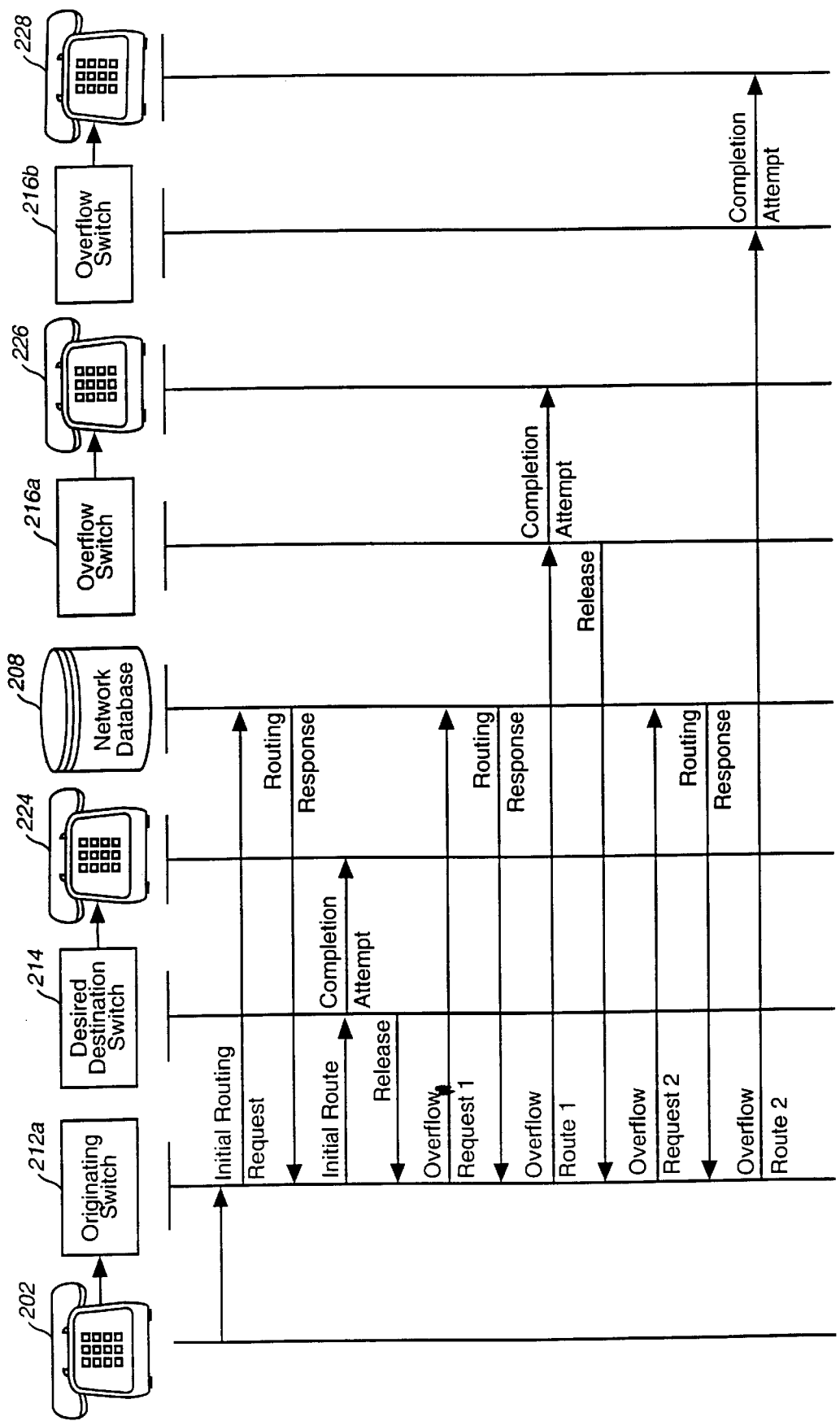

FIG. 3 is an example of the operation of network 200, in accordance with the present invention. It is best viewed in conjunction with FIG. 2a. When a call is placed from origination 202 to termination 224, the call is connected through telephone system 204. The call enters network 200 through one of tie originating switches 212a–n, for example, through switch 212a. If the call is a special service call, such as a call to an 800, 900 or virtual network (VNET) number, switch 212a sends an initial routing request to network database 208 over signaling network 210. Network database 208 returns a routing response containing a translated number. The translated number is a geographic telephone number for termination 224 with which switch 212a can route the call. Originating switch 212a routes the call to desired terminating switch 214, which attempts to complete the call through telephone system 218 to termination 224.

If the call cannot be completed, originating switch 212a detects that condition, either by expiration of a timer, in the case of ring no answer, or by receiving a signaling message from terminating switch 214, in all other cases. In all cases, originating switch 212a then releases the call to terminating switch 214. Originating switch 212a then sends network database 208 an overflow request over signaling network 210 requesting an alternate termination for the call. The overflow request includes the dialed telephone number and an indicator of the cause of the call completion failure. Network database 208 accesses the overflow trees for that called number and determines the response specified by the appropriate overflow tree, based on the indicated cause. Network database 208 then sends a routing response to switch 212a containing an indication of the alternate termination. Originating switch 212a then routes the call to the alternate termination through an overflow terminating switch. For example, the call may be routed to station 226 through overflow terminating switch 216a. The terminating switch which is currently attempting to complete the call is the current terminating switch.

If the call to station 226 cannot be completed, originating switch 212a again detects this condition, releases the call from overflow terminating switch 216a and sends another overflow request to network database 208. This process repeats until the call is completed or until a predetermined number of completions have been attempted. For any given call, network database 208 keeps track of the number of completion attempts and terminates the process when a predetermined number has been exceeded.

A signaling message is generated by the current terminating switch when it detects that the call cannot be completed to the current destination. The signaling message is transmitted from the current terminating switch to originating switch 212a over signaling network 210. Signaling network 210 is a separate network from trunks 230. Even if the call has been routed through an intermediate switch, the signaling message from the current terminating switch is not handled by the intermediate switch. Thus, originating switch 212a always receives the signaling message from the current terminating switch, never from any intermediate switch.

Figure 4A:
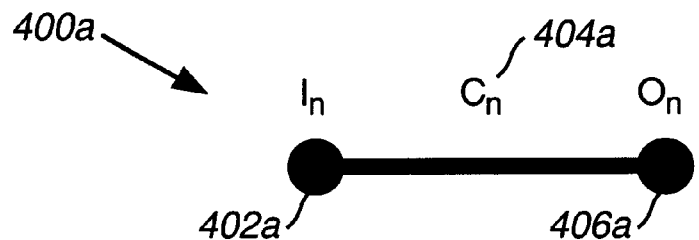
FIG. 4a is an example of a basic overflow statement 400a used to specify overflow routing.
Figure 4B:
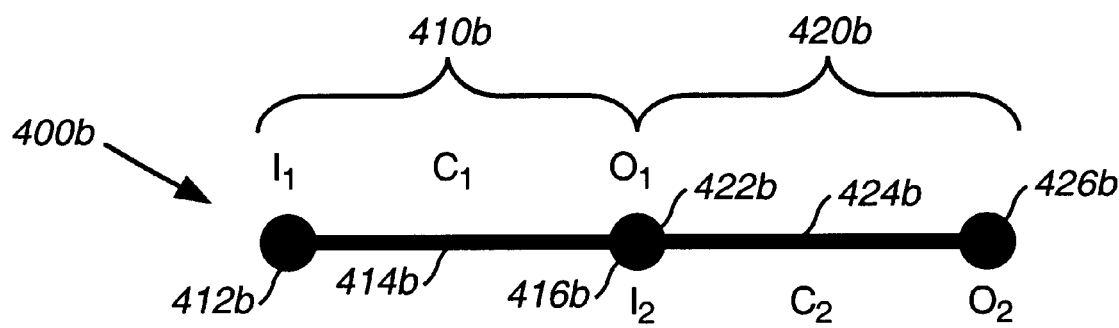
FIG. 4b is an example of two overflow statements combined to form an overflow branch statement 400b.
Figure 4C:
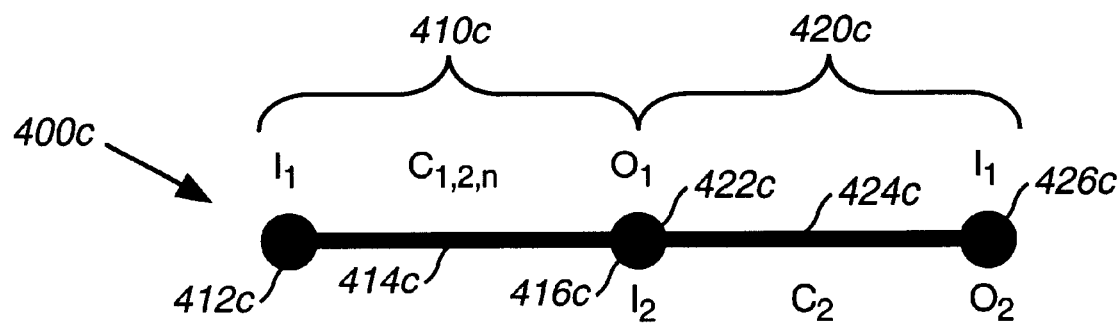
FIG. 4c is an example of an overflow sequence 400c, which loops back upon itself and also contains a multiple condition.
Figure 4D:
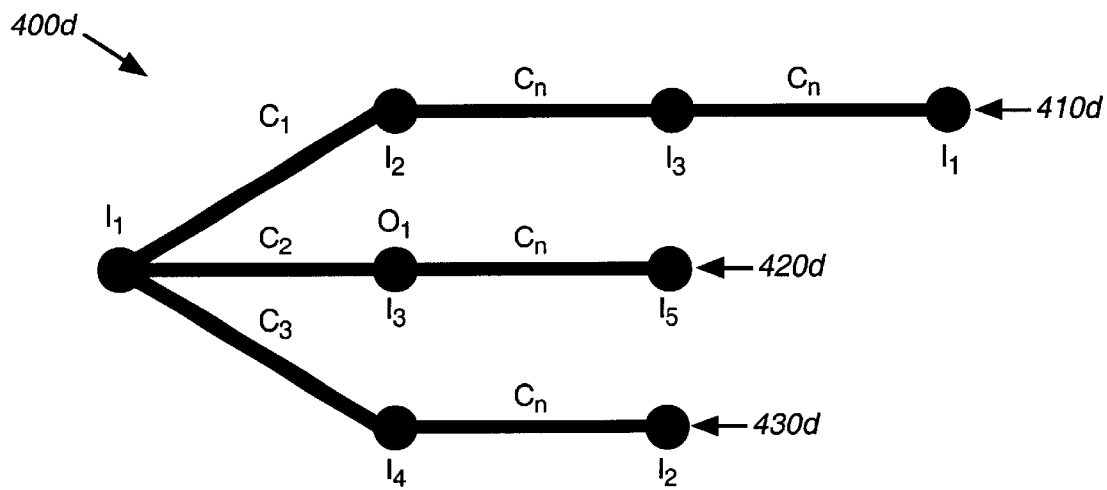
FIG. 4d is an example of a multiple branch overflow tree.

FIG. 4a is a flow diagram of a basic overflow statement 400a used to specify overflow routing. Statement 400a includes three components. $I_n$ 402a is the intended termination of the call, $C_n$ 404a is the condition encountered and $O_n$ 406a is the object of the statement.

The intended termination of the call is the service location to which the call was originally intended to be completed on the original call completion attempt. The intended termination is also the previous intended termination for all overflow completion attempts. The intended service location may be any of several termination types, such as, for example, seven-digit digital trunk controller (DTC) dedicated access lines (DAL), ten-digit DTC DALs, flexible DTC DALs, switched terminations through a local exchange network and outbound international virtual network connections.

The condition encountered is the condition at the intended service location on which overflow action is to be taken. In general, there are four conditions.

1. Busy—a busy condition is defined as an All Trunks Busy condition at, the terminating switch.

2. Ring-No-Answer—a ring-no-answer condition is defined as a condition where the call is completed to the terminating station, but the call is not answered within a predetermined time period. To determine a ring-no-answer condition, the originating switch begins an overflow timer upon receipt from the terminating switch of a signaling message indicating that the call is ringing. Upon expiration of the timer, overflow action is invoked for the call. Should the terminating switch return an Answer Supervision response to the originating switch prior to the timer expiration, the overflow timer will be canceled.

3. ISDN Cause Values—are indicators of the reason a local exchange network (LEN) or a customer premise equipment (CPE), such as a private branch exchange (PBX), cannot complete a call. These indicators are generated by the LEN or CPE and are returned to the originating switch via a signaling message.

4. Other—other conditions include network problems that prevent the call from reaching its intended termination, such as, for example, network congestion, a cut cable or blockage of the call by the local exchange network (LEN). Additional information which could be used to indicate conditions include, for example, original access information, such as caller identification, originating switch identification and originating trunk group identification. For another example, attempted termination data could be used, such as terminating switch identification, terminating trunk group type identification, outpulsed address digits and previous database system action codes.

The user can specify which condition or combination of conditions is to be acted upon by including those specific conditions in the sequence of overflow statements for the intended termination. It is also possible for the user to specify all conditions in a single statement, rather than specifying each condition separately.

If a condition specified in an overflow statement is satisfied, the action indicated in that statement is performed. There are two possible actions: overflow and treatment.

1. Overflow—allows users to redirect calls from an intended termination location to a secondary location.

2. Treatment—rather than redirecting the call to a secondary termination, the user may prefer to provide a treatment such as, for example, a busy signal, a network announcement or a customized announcement.

If an overflow condition which is not included in any specified overflow statements is encountered, overflow processing will not be invoked and the call will receive normal call treatment.

The object of overflow statement is typically the service location to which a call will be sent if an overflow action is specified and the overflow condition at the intended service location is met. An object may be any of the termination types allowed for intended terminations.

If the action specified is treatment rather than overflow, the object specified may not be a service location. Instead, a treatment type is specified as the object, such as, for example, a busy signal or a network message.

Overflow statements may be combined or strung together to form overflow branches. Overflow branches represent a sequential series of overflow instructions to be attempted if a call cannot be completed to the intended termination. FIG. 4$b$ is an example of two statements, 410$b$ and 420$b$, combined to form a short branch statement 400$b$. The object, $O_1$ 416$b$, of the first statement 410$b$ has automatically become the intended service location 422$b$ of the second statement. Statement 400$b$ specifies:

Statement 410$b$: if, at intended service location $I_1$ 412$b$, condition $C_1$ 414$b$ is encountered, overflow the call to object $O_1$ 416$b$, which is also intended service location $I_2$ 422$b$ for the second overflow statement 420$b$.

Statement 420$b$: if, at intended service location $I_2$ 422$b$, condition $C_2$ 424$b$ is encountered, overflow the call to object $O_2$ 426$b$.

Statements may only be combined if the object of the first statement is a service location. Several overflow statements may be combined together in a single branch, one statement for each overflow attempt up to the maximum allowed number of overflow attempts. If a treatment is specified as the object of an overflow statement, the branch is ended and no other statements may be appended.

FIG. 4$c$ is an example of an overflow sequence 400$c$, which loops back upon itself. Statement 400$c$ also exemplifies a multiple condition specification. Statement 400$c$ specifies:

Statement 410$c$: if, at intended service location $I_1$ 412$c$, at least one of condition $C_1$, $C_2$, or $C_n$ 414$c$ is encountered, overflow the call to object $O_1$ 416$c$, which is also intended service location $I_2$ 422$c$ for the second overflow statement 420$c$.

Statement 420$c$: if, at intended service location $I_2$ 422$c$, condition $C_2$ 424$_c$ is encountered, overflow the call to object $O_2$ 426$c$, which is also intended service location $I_1$ 412$c$.

In the event a non-specified condition occurs, the call will received normal call treatment. The predetermined maximum number of attempts prevents looping indefinitely.

At the originally intended termination, it is possible to act on individual conditions uniquely. This allows the user to form "trees" of overflow sequences. In one embodiment, each tree for a given service location may branch only once, on the initial attempt to deliver the call to the originally intended service location. This simplifies the logic for the order entry process. In another embodiment, additional branching is allowed. This increases the flexibility of the overflow process, at the expense of added complexity in the order entry process.

FIG. 4$d$ is an example of a multiple branch overflow tree. Statement 400$d$ has multiple overflow branches 410$d$, 420$d$ and 430$d$. If the call encounters condition $C_1$, which represents a set of one or more conditions, at $I_1$, the call will overflow to $I_2$ and continue down branch one 410$d$ until the call is completed., the maximum number of overflow attempts have occurred, or the end of the branch is reached. If the call encounters condition $C_2$, which represents a set of one or more conditions, at $I_1$, the call will overflow to $I_3$ and continue down branch 420$d$. If the call encounters condition $C_3$, which represents a set of one or more conditions, at $I_1$, the call will overflow to $I_4$ and continue down branch 430$d$. Once the overflow tree has branched at the original intended service location, it cannot branch again. Only a sequential series of statements may be linked.

It is possible to go from tree to tree by linking multiple trees together. Trees may be liked by flagging the last object of a branch to "GOTO" that object's tree if overflow service has been subscribed and an overflow tree defined for that object. FIG. 4$e$ is an example of one overflow tree linked to a second overflow tree. When the call reaches the end of branch 420$e$, $I_5$, the overflow tree for $I_5$, not $I_1$, will be used for subsequent overflow attempts. Even though the call has overflowed to a second overflow tree, the original overflow attempt counter is still in effect and the call cannot be overflowed more than the specified maximum number of times.

Figure 4F:
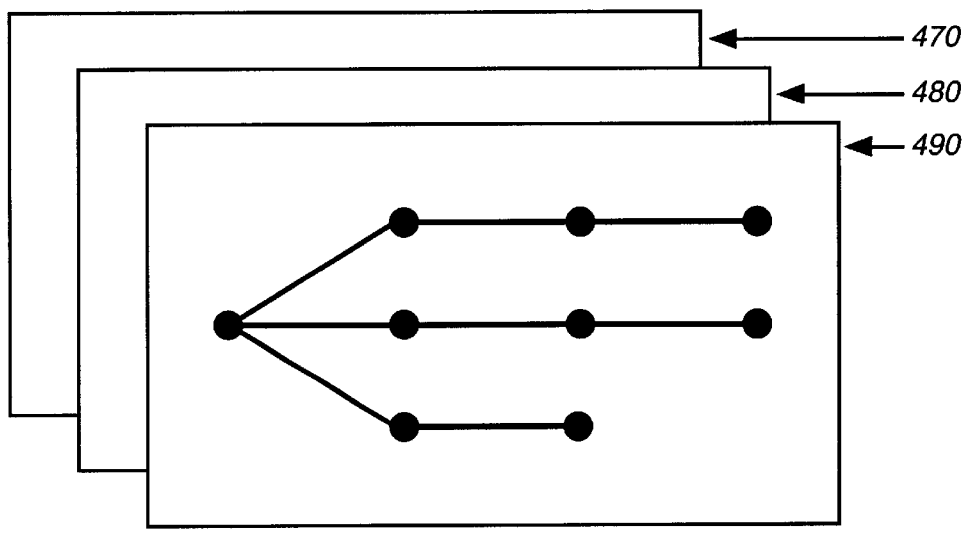
FIG. 4f shows three levels of overflow tree hierarchy.
Figure 4E:
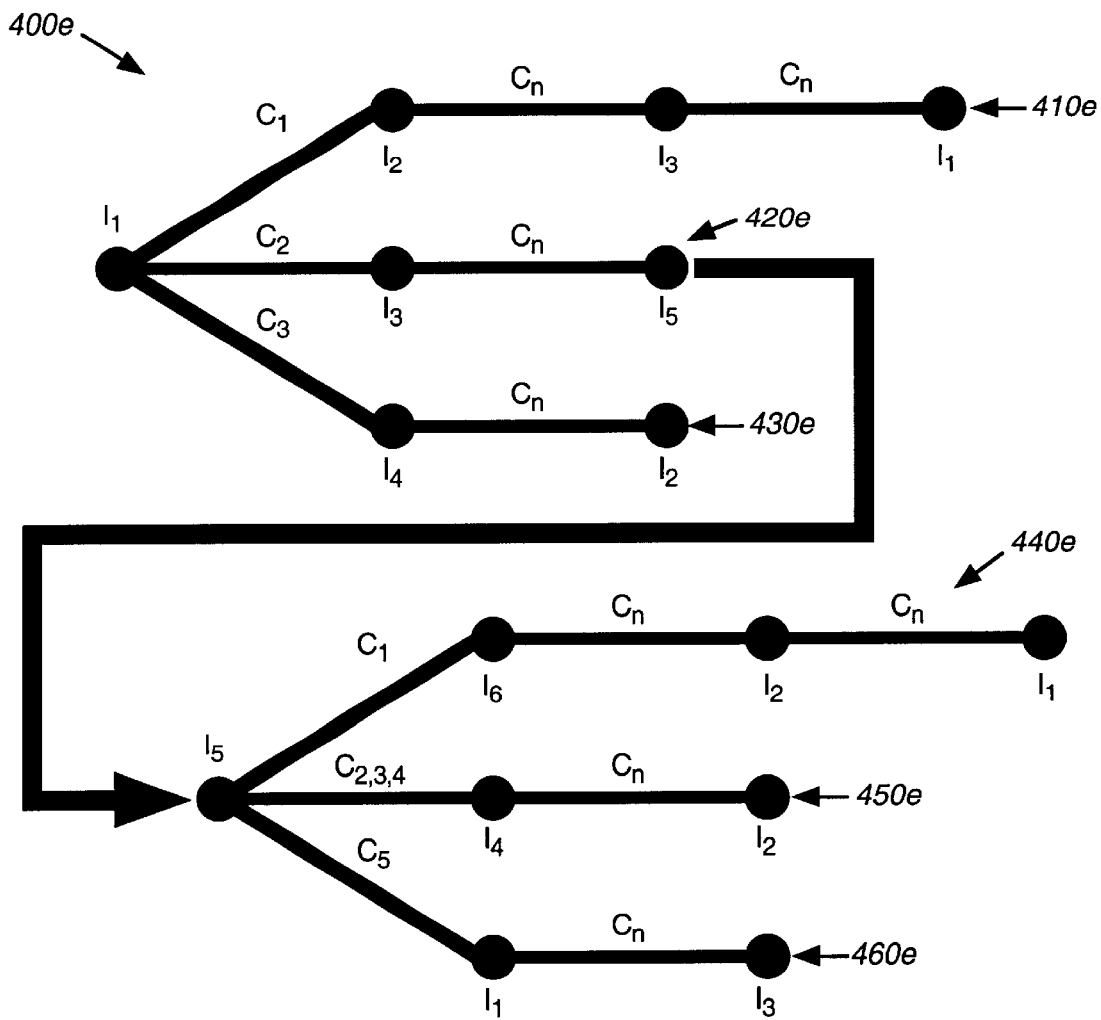
FIG. 4e is an example of one overflow tree linked to a second overflow tree.

Overflow trees are arranged in a set hierarchy which provides a priority of execution. The highest available level of hierarchy will be executed. As shown in FIG. 4f, there are three levels in the hierarchy: Default 470, Outpulse Exception 480 and Dialed Number Exception 490. The Dialed Number is the pre-translated number; it is the number as dialed by the caller. The Outpulse number is the translated number sent to the terminating service location. Regardless of the level at which a tree is defined, the structure and components of the branches and overflow statements remain the same as described above.

The default overflow tree acts as a catch-all for incoming calls to the intended service location. The Outpulse and Dialed Number exception overflow trees provide added layers of granularity for handling overflow traffic for a given service location.

When an incoming call cannot be completed and overflow has been subscribed, the network database will search for a match using first the Dialed Number Exception tree, then the Outpulse Exception tree and finally the Default tree. An incoming call may only be matched to one level of overflow tree. This is done at the time the initial overflow condition occurs.

There may be multiple overflow trees defined for each level of hierarchy. Each overflow tree may be set to active or inactive. Only trees that are active are screened against incoming calls. For both the Dialed Number and Outpulse levels, multiple overflow trees may be active simultaneously. For the Default level, only one overflow tree can be active at a time. All other trees at the Default level must be set to inactive. The user may change the status—active or inactive—of each overflow sequence as needed.

Figure 5A:
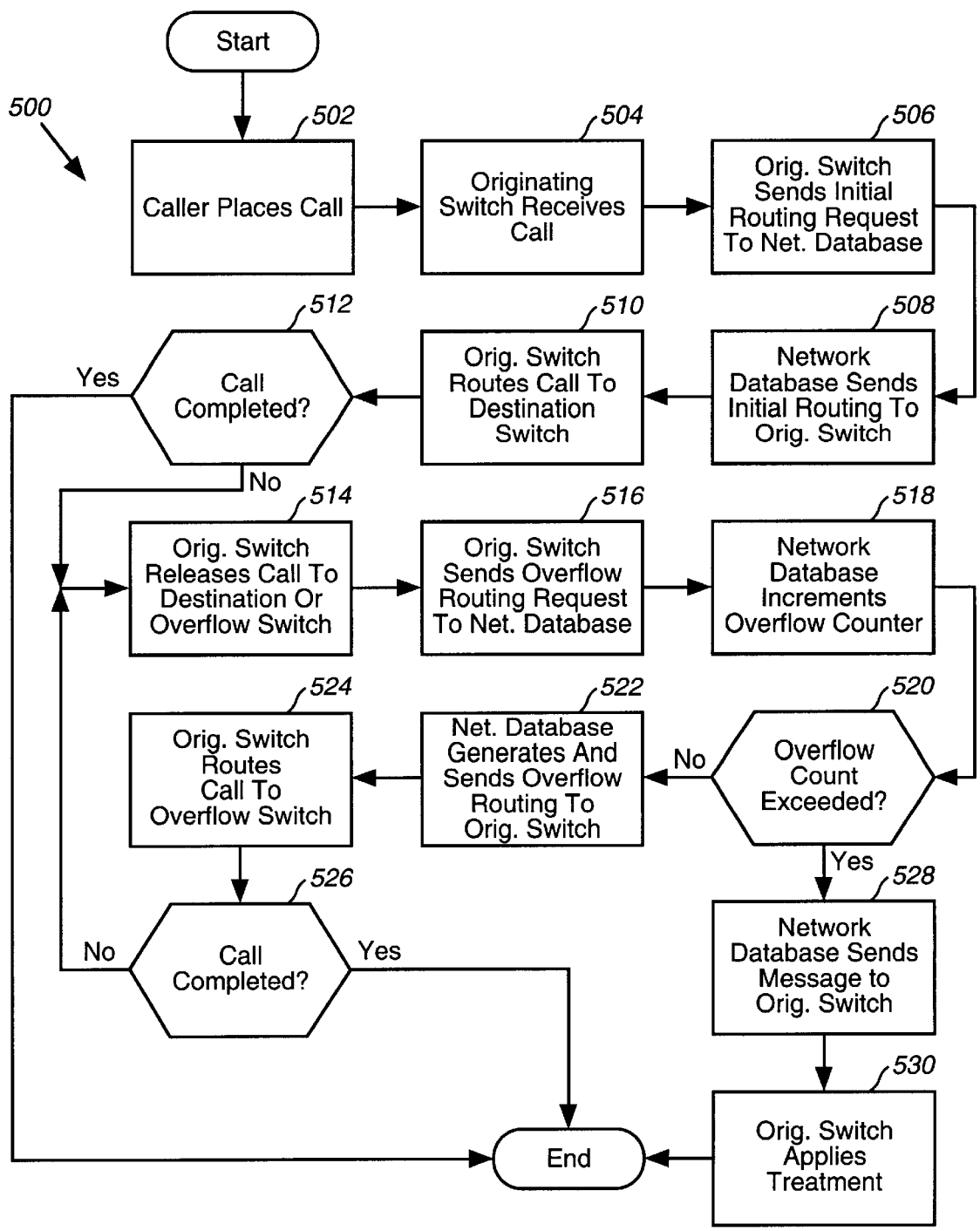

FIG. 5a is a flow diagram of process 500, implemented in network 200 of FIG. 2a. The process begins with step 502, in which the caller places a call. In step 504, the originating switch receives the call. In step 506, the originating switch sends an initial routing request to the network database. The initial routing request is a request for routing from the originating switch to the desired terminating switch. In step 508, the network database sends the initial routing to the originating switch. The initial routing is a routing from the originating switch to the desired terminating switch. In step 510, the originating switch routes the call to the desired terminating switch, based on the initial routing supplied by the network database.

In step 512, the originating switch detects whether the call has been completed. There are two ways in which the originating switch may detect completion failure. First, when the originating switch receives a signaling message that the call has been completed as far as the terminating switch, the originating switch starts a timer. If the timer reaches a predetermined value before the originating switch receives a signaling message indicating that the call has been answered by the termination, the originating switch detects a completion failure. In this way, the originating switch detects a ring-no-answer situation. If the originating switch receives a signaling message indicating that the call has been answered by the termination before the timer has reached a predetermined value, the originating switch detects a call completion. Second, if the originating switch receives a signaling message indicating that the termination is busy, that network congestion or failure prevents completion or that the termination telephone system did not complete the call for some reason, the originating switch detects a completion failure. In the case of the termination telephone system not completing the call, if the termination telephone system is ISDN capable, an ISDN cause value indicating the reason the call was not completed is also received by the originating switch. If the originating switch detects a call completion, the process ends.

If the originating switch detects a completion failure, the process goes to step 514, in which the originating switch releases the call to the terminating switch. In step 516, the originating switch sends a request for overflow routing to the network database. This request includes the number of the termination to which the call failed to complete and the condition encountered. In step 518, the network database increments its overflow counter associated with the particular call being handled. In step 520, the network database determines whether the predetermined maximum overflow count has been exceeded. If so, the process goes to step 528, in which the network database sends a message indicating that the call should be blocked. In step 530, the originating switch applies a treatment, such as, for example, playing a busy signal or an audio message to the caller.

If the maximum overflow count has not been exceeded, the process goes to step 522, in which the network database generates and sends an overflow routing to the originating switch. The overflow routing is determined by the network database using one or more overflow statements which specify actions, the conditions under which the actions are to be performed and the objects upon which the actions are to be performed. The relevant information includes, for example, the completion failure condition which was detected and the number of routing attempts which have occurred, as is explained in detail below. In step 524, the originating switch routes the call to the indicated overflow terminating switch, based on the overflow routing supplied by the network database.

In step 526, the originating switch detects whether the call has been completed, as was done in step 512 above. If the call has been completed, the process ends. If the completion failed, the process loops to step 514.

Figure 5B:
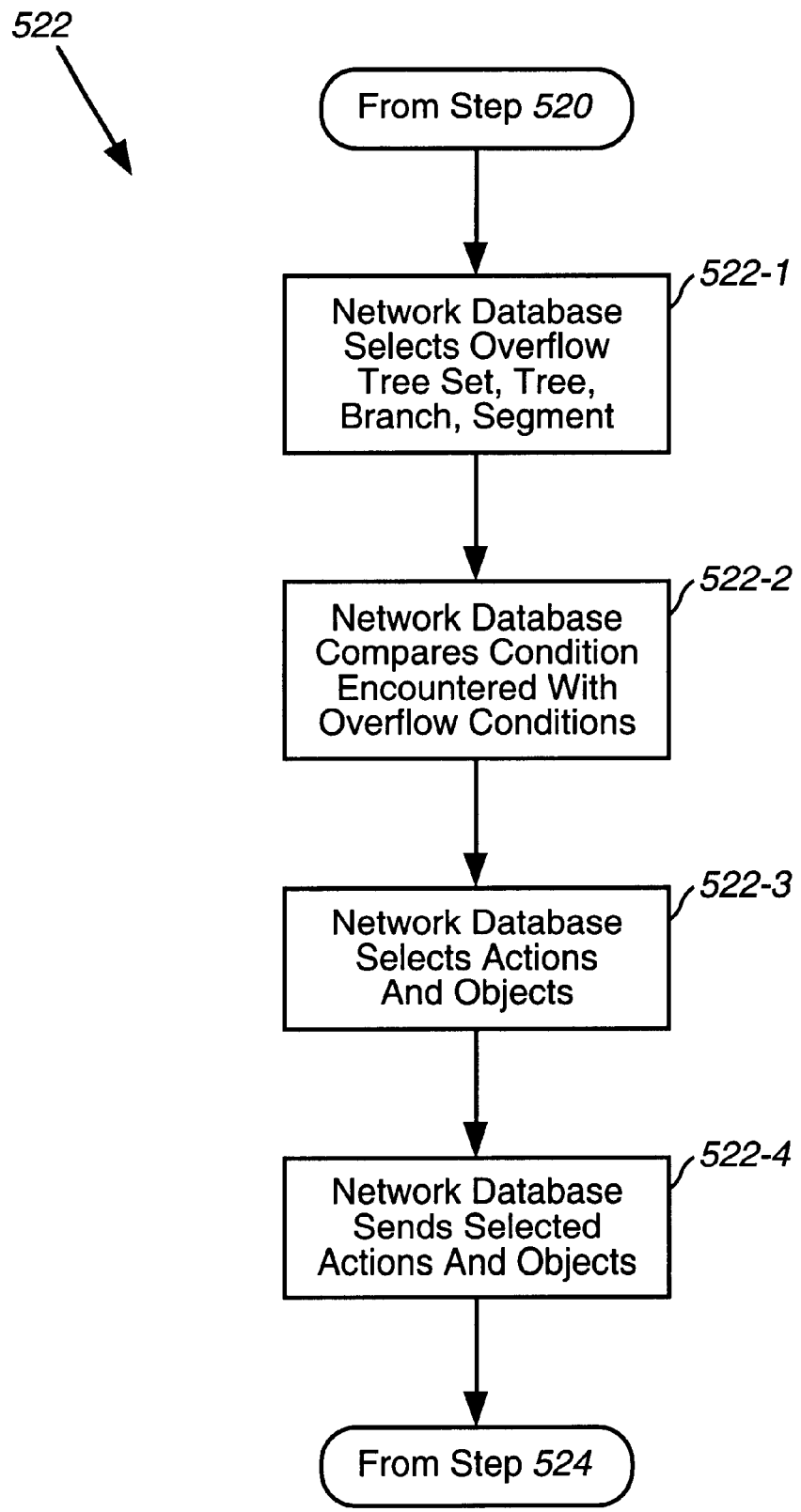
FIG. 5b is a flow diagram of a subprocess of step 522 of process 500.

FIG. 5b is a flow diagram of the subprocess of step 522 of FIG. 5a. Subprocess 522 begins with step 522-1, in which the network database selects the appropriate overflow tree from amongst those stored in memory. The overflow tree set is selected based on the called number included in the overflow routing request message sent by the originating switch. As described above, the network database searches the hierarchy to find active overflow statements. Once the appropriate overflow tree is selected, the appropriate branch is located and the appropriate segment is determined based on the intended termination of the call. In step 522-2, the network database compares the condition or conditions specified in the selected overflow tree segments with the encountered condition as specified in the message from the originating switch. In step 522-3, the network database selects the actions and objects specified in segments having conditions which match the encountered condition. If an overflow condition which is not included in any specified overflow statements is encountered, overflow processing will not be invoked and the call will receive normal call treatment. In step 522-4, the network database sends a message containing an indicator of the selected actions and objects to the originating switch.

FIG. 6 is a chart of typical ISDN cause values which may be used as conditions encountered to control overflow processing. Indications of these values are sent from the originating switch to the network database in step 516 of process 500. The values shown are examples only. The present invention is capable of handling any currently defined values, or any values which may be defined in the future.

Although specific embodiments of the present invention have been disclosed, it will be seen by one of skill in the art that other embodiments which are equivalent are possible.

What is claimed is:

1. A method of redirecting a telephone call from a first termination in a telecommunications network to a second termination in said telecommunications network, said telecommunications network including a plurality of interconnected switches, wherein said call enters the network at an originating switch, each of said terminations being coupled to a terminating switch, the method comprising the steps of:

a) routing said call from said originating switch to a first terminating switch coupled to said first termination;

b) after routing said call to said first terminating switch, determining, at said originating switch, whether said call is completed to said first termination;

c) upon determining that said call has not been completed, releasing said call from said first terminating switch and transmitting from said originating switch to a network database a request for an indication of a second termination, said request having an indication of said first termination and of the condition encountered;

d) using information relating to why said call was not successfully completed at said first termination and said condition encountered to select from at least one set of overflow statements providing instructions for overflow routing said second termination at said network database, wherein step d) further comprises the steps of:

selecting an overflow tree set from said set of overflow statements based on said original termination;

selecting an active overflow tree from said selected overflow tree set;

selecting a segment of said selected tree based on said original termination of said call;

comparing the condition encountered with a condition specified by said selected segment; and selecting an action and an object specified by said selected segment, if said condition encountered matches said condition specified by said selected segment;

e) transmitting from said network database to said originating switch said indication of said second termination; and f) upon receiving said indication of said second termination from said network database, routing said call to a second terminating switch coupled to said second termination.

2. The method of claim 1, further comprising the step of:
   repeating steps c to f for each termination indicated by said network database until either said call is completed or said steps have been repeated a predetermined number of times.

3. The method of claim 1, wherein said object comprises an indicator of a termination; and
   wherein said action comprises the step of redirecting said call to the termination specified by said object.

4. The method of claim 1, wherein said object comprises an indicator of a treatment; and wherein said action comprises the step of applying to said call the treatment specified by said object.

5. The method of claim 1, wherein at least one of said terminations comprises a telephone station.

6. The method of claim 1, wherein at least one termination comprises a customer premise equipment.

7. The method of claim 1, wherein the step of selecting an active overflow tree from said selected set further comprises the steps of:

selecting said active overflow tree to correspond to a dialed number of said call if there is an active overflow tree corresponding to the dialed number of said call;

selecting said active overflow tree to correspond to an outpulse number of said call if there is no active overflow tree corresponding to the dialed number of said call and if there is an active overflow tree corresponding to said outpulse number of the call; and selecting a default overflow tree if there is no active overflow tree corresponding to either said dialed number of said call or said outpulse number of said call.

8. A system for redirecting a telephone call from a first termination in a telecommunications network to a second termination in said telecommunications network, said telecommunications network including a plurality of interconnected switches, wherein said call enters the network at an originating switch and each of said terminations is coupled to a terminating switch, the system comprising:

an originating switch having
      an indicator of a first termination of said call;
      a call router for selecting a terminating switch coupled to said indicated first termination and routing said call to said selected terminating switch;
      a detector, coupled to said selected terminating switch, for detecting whether said routed call is completed from said selected terminating switch to said indicated termination, and for generating a condition encountered;
      a call releasing device, coupled to said selected terminating switch and said detector, for releasing said call to said selected terminating switch, when in receipt from said detector an indication that said call has not been completed; a request transmitter, coupled to a network database and said detector, for transmitting to said network database a request for an indication of said second termination when in receipt of said indication from said detector that said call has not been completed, said request including an indication of said first termination and of said condition encountered;
      a response receiver, coupled to said network database, for receiving a response containing said indication of said second termination from said network database; and
      an indicator updating device for updating said indicator to contain said indication of said second termination;

a terminating switch having
      a call receiver for receiving said call from said originating switch; and
      a call completion device, coupled to said call receiver and said original termination, for attempting to complete the call to said original termination; and a network database having
      a request receiver coupled to said originating switch, for receiving a request for a second termination for said call;
      data store for storing information relating to selection of additional terminations for calls said information including at least one set of overflow statements providing instructions for overflow routing;
      a selector, coupled to said request receiver and said data store, for using information received in said request for selecting one of said additional terminations as said second termination for said call from amongst the information relating to said additional terminations for calls; and a response transmitter, coupled to said originating switch, for returning an indicator of said second termination to said originating switch, wherein said at least one set of overflow statements comprises: an overflow tree having a plurality of overflow statements; and wherein said selector of said network database further comprises: an overflow statement selector, coupled to said message receiver, for selecting one of said overflow statements of said selected tree based on condition encountered at said original termination of said call.

9. The system of claim 8, wherein the information relating to selection of said second termination for said call comprises:

an overflow segment having respective indicators of a termination, a condition and an indicator of an alternate termination; and wherein said selector of said network database comprises:

a comparator, coupled to a message receiver, for comparing the condition encountered with a condition specified by said overflow segment;

an alternate termination selector, coupled to said comparator, for selecting said alternate termination indicated by said overflow segment if the condition encountered matches the condition specified by said overflow segment.

10. The system of claim 8, wherein the information relating to selection of said second termination for said call further comprises:

an overflow statement having a plurality of overflow segments; and wherein said selector of said network database further comprises:

an overflow segment selector, coupled to said message receiver, for selecting one of said overflow segments that has an indicator of a termination corresponding to the termination of said call.

11. A system for redirecting a telephone call from a first termination in a telecommunications network to a second termination in said telecommunications network, said telecommunications network including a plurality of interconnected switches, wherein said call enters the network at an originating switch and each of said terminations is coupled to a terminating switch, the system comprising:

an originating switch having an indicator of a first termination of said call;

a call router for selecting a terminating switch coupled to said indicated first termination and routing said call to said selected terminating switch;

a detector, coupled to said selected terminating switch, for detecting whether said routed call is completed from said selected terminating switch to said indicated termination, and for generating a condition encountered; a call releasing device, coupled to said selected terminating switch and said detector, for releasing said call to said selected terminating switch, when in receipt from said detector an indication that said call has not been completed, a request transmitter, coupled to a network database and said detector, for transmitting to said network database a request for an indication of said second termination when in receipt of said indication from said detector that said call has not been completed, said request including an indication of said first termination and of said condition encountered;

a response receiver, coupled to said network database, for receiving a response containing said indication of said second termination from said network database; and an indicator updating device for updating said indicator to contain said indication of said second termination;

a terminating switch having a call receiver for receiving said call from said originating switch; and a call completion device, coupled to said call receiver and said original termination, for attempting to complete the call to said original termination; and a network database having a request receiver coupled to said originating switch, for receiving a request for a second termination for said call;

data store for storing information relating to selection of additional terminations for calls said information including at least one set of overflow statements providing instructions for overflow routing;

a selector, coupled to said request receiver and said data store, for using information received in said request for selecting one of said additional terminations as said second termination for said call from amongst the information relating to said additional terminations for calls; and a response transmitter, coupled to said originating switch, for returning an indicator of said second termination to said originating switch, wherein the information relating to selection of said second termination for said call further comprises: an overflow tree set having a plurality of overflow trees, each of said overflow trees having an indicator of whether it is active; and wherein said selector of said network database further comprises: an overflow tree selector, coupled to said overflow tree set selector, for selecting an active overflow tree.

12. The system of claim 11, wherein said overflow tree set comprises a plurality of hierarchical levels each having a plurality of overflow trees; and wherein said overflow tree selector selects an active overflow tree from the highest hierarchical level containing an active overflow tree.

13. The system of claim 11, wherein said overflow tree set comprises three levels of hierarchy, said hierarchy having a level corresponding to a dialed number of said call;

a level corresponding to an outpulse number of said call, and a default level; and wherein said overflow tree selector comprises:

a dialed number overflow tree selector, coupled to said overflow tree set selector, for selecting an active overflow tree corresponding to a dialed number of said call if there is an active overflow tree corresponding to said dialed number of said call;

an outpulse number overflow tree selector, coupled to said dialed number overflow tree selector, for selecting an active overflow tree corresponding to an outpulse number of said call if there is no active overflow tree corresponding to said dialed number of said call and if there is an active overflow tree corresponding to said outpulse number of the call; and a default selector, coupled to said outpulse number overflow tree selector, for selecting a default overflow tree if there is no active overflow tree corresponding to either said dialed number of said call or said outpulse number of said call.

14. A system for redirecting a telephone call from a first termination in a telecommunications network to a second termination in said telecommunications network, said telecommunications network including a plurality of interconnected switches, wherein said call enters the network at an originating switch and each of said terminations is coupled to a terminating switch, the system comprising:

an originating switch having
  an indicator of a first termination of said call;
  a call router for selecting a terminating switch coupled to said indicated first termination and routing said call to said selected terminating switch;
  a detector, coupled to said selected terminating switch, for detecting whether said routed call is completed from said selected terminating switch to said indicated termination, and for generating a condition encountered;
  a call releasing device, coupled to said selected terminating switch and said detector, for releasing said call to said selected terminating switch, when in receipt from said detector an indication that said call has not been completed,
  a request transmitter, coupled to a network database and said detector, for transmitting to said network database a request for an indication of said second termination when in receipt of said indication from said detector that said call has not been completed, said request including an indication of said first termination and of said condition encountered;
  a response receiver, coupled to said network database, for receiving a response containing said indication of said second termination from said network database; and
  an indicator updating device for updating said indicator to contain said indication of said second termination;

a terminating switch having
  a call receiver for receiving said call from said originating switch; and
  a call completion device, coupled to said call receiver and said original termination, for attempting to complete the call to said original termination; and a network database having
  a request receiver coupled to said originating switch, for receiving a request for a second termination for said call;
  data store for storing information relating to selection of additional terminations for calls said information including at least one set of overflow statements providing instructions for overflow routing;
  a selector, coupled to said request receiver and said data store, for using information received in said request for selecting one of said additional terminations as said second termination for said call from amongst the information relating to said additional terminations for calls; and
  a response transmitter, coupled to said originating switch, for returning an indicator of said second termination to said originating switch, wherein said network database further comprises:
an overflow segment having respective indicators of a termination, a condition and an alternate termination;
an overflow statement having a plurality of overflow segments;
an overflow tree having a plurality of overflow statements; and
an overflow tree set having a plurality of hierarchical levels each including a plurality of overflow trees each having an indicator of whether it is active; and wherein said selector of said network database comprises:
an overflow tree selector, coupled to said overflow tree set selector, for selecting an active overflow tree from the highest hierarchical level containing an active overflow tree;
an overflow statement selector, coupled to a message receiver, for selecting an overflow statement of a selected tree based on condition encountered at the original termination of said call;
an overflow segment selector, coupled to said message receiver, for selecting an overflow segment having an indicator of a termination corresponding to the termination of said call;
a comparator, coupled to said message receiver, for comparing the condition encountered with a condition specified by said selected overflow segment; and
an alternate termination selector, coupled to said comparator, for selecting said alternate termination indicated by said selected overflow segment if said condition encountered matches said condition specified by said selected overflow segment.

* * * * *